Aug. 2, 1966   J. M. S. KEEN   3,264,043
BEARING ASSEMBLY
Filed Jan. 20, 1964
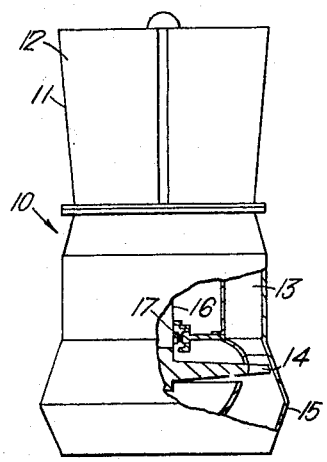
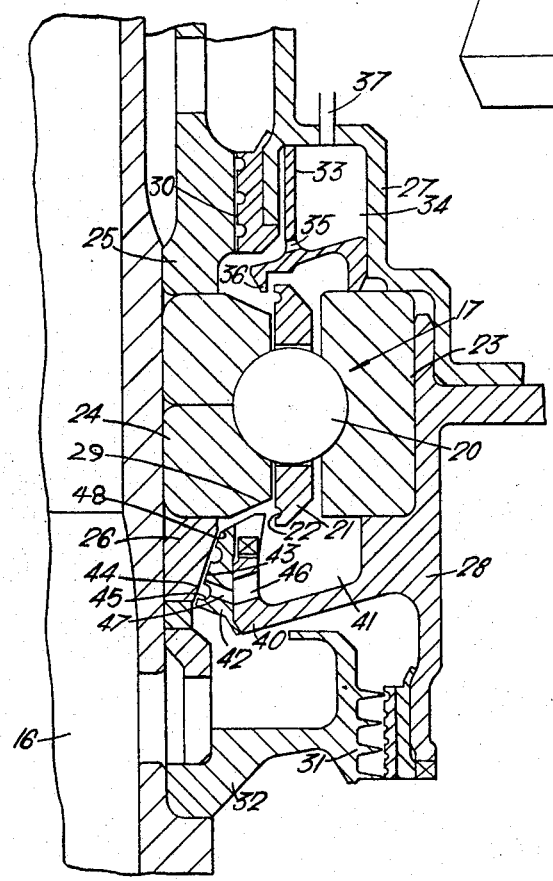
Inventor
John Michael Storer Keen
By
Cushman, Darby & Cushman
Attorneys

BEARING ASSEMBLY

John Michael Storer Keen, Derby, England, assignor to Rolls-Royce Limited, Derby, England, a company of Great Britain
Filed Jan. 20, 1964, Ser. No. 338,681
Claims priority, application Great Britain, Jan. 31, 1963, 4,125/63
4 Claims. (Cl. 308—187)

This invention concerns a bearing assembly.

According to the present invention, there is provided a bearing assembly comprising a bearing, means for feeding a lubricant to said bearing, two members which are respectively provided with closely adjacent faces and at least one of which members is rotatable about a given axis, the said faces being inclined with respect to the said given axis, and at least one of said faces being provided with a helical groove opposite ends of which are disposed relatively closer to and relatively further from the said given axis, the said relatively closer end being arranged to receive lubricant which has passed through the bearing, and the said relatively further end being arranged to deliver lubricant back to the bearing for recirculation therethrough.

Preferably the bearing assembly comprises a reservoir chamber which is adapted to be filled with a predetermined quantity of lubricant, means being provided for passing a predetermined flow of lubricant from the reservoir chamber to the bearing.

One of the said members is preferably secured to a shaft which is rotatably mounted in said bearing, whereby the said given axis is the axis of the shaft. The other member is preferably stationary and is provided with the said groove.

The stationary member may be carried by the wall of a stationary sump chamber, the sump chamber being arranged to receive lubricant which has passed through the bearing, the said stationary member and the said stationary sump chamber having passages therethrough by means of which lubricant in the sump chamber may pass to the said relatively closer end of the said groove.

The invention also comprises a gas turbine engine provided with such a bearing assembly. Thus the gas turbine engine may be a vertical lift engine whose main shaft is rotatably mounted in the said bearing.

The term "vertical lift engine," as used in this specification, is to be understood to mean an engine which is adapted to produce vertical lift forces an aircraft independently of those produced aerodynamically by forward flight of the aircraft.

The invention is illustrated, merely by way of example, in the accompanying drawings, in which:

FIGURE 1 is a diagrammatic front elevation, partly in section, of a gas turbine vertical lift engine incorporating a bearing assembly according to the present invention, and FIGURE 2 is a broken away section illustrating part of the structure of FIGURE 1 on a larger scale.

Referring to the drawings, a gas turbine vertical lift engine 10 comprises an engine casing 11 within which are mounted in flow series a compressor 12, combustion equipment 13, and a turbine 14, the turbine exhaust gases being directed to atmosphere through a jet pipe 15.

The compressor 12 and turbine 14 are mounted on the main shaft 16 of the engine, the main shaft 16 being rotatably mounted in a front bearing (not shown) and in a rear bearing 17.

The rear bearing 17 includes ball bearings 20 mounted in a rotatable cage 21. The rotatable cage 21 is provided adjacent its lower end with an annular groove 22 which communicates with some passageways (not shown) which extend to and are inclined towards the ball bearings 20. The rear bearing 17 also includes an outer race 23, and a two part inner race 24 which is disposed between rotatable members 25, 26 which are secured to the main shaft 16.

The inner race 24 has a frusto conical surface 29, which is inclined towards the ball bearings 20.

The outer race 23 is located between fixed wall members 27, 28 which are connected (by means not shown) to the engine casing 11. The fixed wall member 27 is sealed to the rotatable member 25 by a labyrinth seal 30, while the fixed wall member 28 is in sealing relationship with a labyrinth seal 31 carried by a rotatable member 32 which is secured to the main shaft 16.

A fixed wall member 33 is mounted within the fixed wall member 27 so as to define therewith a reservoir chamber 34 which is disposed above the bearing 17. The fixed wall member 33 is provided both with an aperture 35 therethrough and with a lip 36. The reservoir chamber 34 is adapted to be filled by way of a pipe 37, with a predetermined quantity of lubricating oil which may be applied to the reservoir chamber 34 in the form of a single shot of oil. The lubricating oil in the reservoir chamber 34 will then pass under gravity, at a predetermined flow rate, through the aperture 35 and over the lip 36 to the ball bearings 20.

The fixed wall member 28 has a wall portion 40 which constitutes the wall of a stationary sump chamber 41 which is disposed beneath the bearing 17 and which is arranged to receive lubricating oil which has passed therethrough.

The wall portion 40 carries a stationary wedge-shaped annular member 42 having a face 43 which is disposed closely adjacent to a face 44 of the rotatable member 26. The faces 43, 44 are, with respect to the axis of the main shaft 16, outwardly inclined from their lower ends so as to extend towards the ball bearings 20. Thus the lower ends of the faces 43, 44 are disposed nearer to the said axis than are their upper ends.

The face 43 is provided with a helical groove 45 whose lower end is supplied with lubricating oil from the sump chamber 41 by way of passages 46, 47 in the wall portion 40 and the annular member 42 respectively.

The annular member 42 is provided with a frusto-conical surface 48 which is disposed parallel and adjacent to the surface 29 and which is thus inclined towards the ball bearings 20.

Oil supplied to the said lower end of the groove 45 is caused, during the operation of the engine, to travel up the groove since it will be subjected to centrifugal force by the rotation of the rotatable member 26. The oil will then leave the upper end of the groove 45 so as to pass through the space between the surfaces 29, 48. Since the surface 29 will be rotating at this time relative to the surface 48, the oil will be forced centrifugally through said space therebetween to reach the annular groove 22 in the rotatable cage 21. The rotatable cage 21 will, however, also be rotating at this time by reason of a fluid drive from the inner race 24. Centrifugal forces will therefore cause the oil which has reached the annular groove 22 to pass up the said passageways in the rotatable cage 21 to reach the ball bearings 20 so as to be recirculated through the bearing 17.

I claim:

1. A bearing assembly comprising: a bearing; means for feeding a lubricant to said bearing; means for receiving lubricant passing from said bearing; two members respectively provided with closely adjacent faces, at least one of said members being rotatable about a given axis, and said faces of said members being inclined with respect to said given axis; and at least one of said faces having a helical groove, said helical groove having opposite ends respectively disposed closer to and further from said given axis, said closer end of said helical groove being in communication with said lubricant receiving means for receiving a lubricant therefrom which has passed through said bearing, and said further end of said helical groove being in communication with said bearing and delivering lubricant from said helical groove back to said bearing for recirculation therethrough independent of said lubricant feeding means.

2. A bearing assembly comprising: a bearing; a lubricant reservoir chamber mounted above said bearing; means communicating said lubricant reservoir chamber with said bearing for permitting a predetermined flow of lubricant to pass under gravity from said lubricant reservoir chamber to said bearing; means for receiving lubricant passing from said bearing; two members respectively provided with closely adjacent faces, at least one of said members being rotatable about a given axis, and said faces of said members being inclined with respect to said given axis; and at least one of said faces having a helical groove, said helical groove having opposite ends which are respectively disposed closer to and further from said given axis, said closer end of said helical groove being in communication with said lubricant receiving means for receiving a lubricant therefrom which is passed through said bearing, and said further end of said helical groove being in communication with said bearing and delivering lubricant from said helical groove back to said bearing for recirculation therethrough independent of lubricant fed from said lubricant reservoir chamber.

3. A bearing assembly comprising: a bearing; a vertical shaft mounted in said bearing for rotation about a given axis, a lubricant reservoir chamber mounted above said bearing; means permitting a predetermined flow of lubricant from said lubricant reservoir chamber to said bearing; a stationary sump chamber mounted below and in communication with said bearing for receiving lubricant passing through the bearing; two members respectively having closely adjacent faces, one of said members being fixedly secured to said stationary sump chamber and the other of said members being fixedly secured to said rotatable shaft for rotation about said given axis, said faces of said members being inclined with respect to said given axis; the face of said member secured to said stationary sump having a helical groove, said helical groove having opposite ends respectively disposed closer to and further from said given axis; and said stationary sump chamber and said member fixedly secured thereto having passages therethrough communicating the sump chamber with the closer end of said helical groove for supplying lubricant to the helical groove, and said further end of said helical groove communicating with said bearing independent of said lubricant reservoir chamber for delivering lubricant from said helical groove to the bearing.

4. In a vertically mounted gas turbine engine, a bearing assembly comprising: a bearing; a shaft mounted in said bearing for rotation about a given axis; means for feeding lubricant in a predetermined flow by gravity to said bearing; a stationary sump chamber mounted beneath said bearing for receiving lubricant passing through said bearing, a first member fixedly secured to said stationary sump; a second member fixedly secured to said rotatable shaft for rotation about said given axis; said first member and said second member having closely adjacent faces inclined with respect to said given axis, and the face of said first member having a helical groove thereon provided with ends respectively disposed closer to and further from said given axis; said stationary sump and said first member having passages therethrough providing communication between the sump chamber and the closer end of said helical groove for supplying lubricant to the groove; and means providing communication between said further end of the helical groove and said bearing independent of said lubricant feeding means for delivering lubricant from said helical groove to the bearing.

References Cited by the Examiner
UNITED STATES PATENTS

| 718,557 | 1/1903 | Wenzel | 103—88 |
| 1,810,083 | 6/1931 | Norinder | 103—84 |
| 2,635,198 | 4/1953 | Wieseman | 308—187 |

DAVID J. WILLIAMOWSKY, *Primary Examiner.*

FRANK SUSKO, *Examiner.*